United States Patent [19]

Laslo

[11] 3,928,005

[45] Dec. 23, 1975

[54] METHOD AND APPARATUS FOR TREATING GASEOUS POLLUTANTS IN A GAS STREAM

[75] Inventor: Dennis J. Laslo, Whitehall, Pa.

[73] Assignee: Fuller Company, Catasauqua, Pa.

[22] Filed: Feb. 19, 1974

[21] Appl. No.: 443,589

[52] U.S. Cl. .................................... 55/73; 55/89
[51] Int. Cl.² .................................. B01D 53/14
[58] Field of Search .......... 55/73, 89, 228; 423/244

[56] References Cited
UNITED STATES PATENTS

| | | | |
|---|---|---|---|
| 2,875,844 | 3/1959 | Pring | 55/77 |
| 2,921,970 | 1/1960 | Gilmore | 55/79 X |
| 3,651,620 | 3/1972 | Lincoln | 55/228 |
| 3,708,266 | 1/1973 | Gustavsson | 55/73 X |
| 3,751,882 | 8/1973 | Phillips | 55/236 |
| 3,807,962 | 4/1974 | Gustavsson | 55/73 X |

FOREIGN PATENTS OR APPLICATIONS

| 794,060 | 4/1958 | United Kingdom | 55/89 |
|---|---|---|---|

OTHER PUBLICATIONS

Joy Manufacturing Co., "Flue Gas Desulfurization", 11–73.

*Primary Examiner*—Charles N. Hart
*Attorney, Agent, or Firm*—Frank H. Thomson

[57] ABSTRACT

A method and apparatus for treating gaseous pollutants such as sulfur dioxide in a gas stream which includes a wet scrubber wherein a compressed gas is used to atomize the scrubbing liquid and a nozzle and the compressed gas direct the atomized liquid countercurrent to the flow of gas to be cleaned. The method and apparatus includes pneumatically conveying to the nozzle a material such as a solid particulate material which reacts with or modifies the pollutant to be removed or altered. The gas used for atomizing the scrubbing liquid is also used as a transport vehicle for the solid particulate material. In the case of sulfur oxides, the material may be pulverized limestone.

6 Claims, 2 Drawing Figures

METHOD AND APPARATUS FOR TREATING GASEOUS POLLUTANTS IN A GAS STREAM

BACKGROUND OF THE INVENTION

The present invention relates to pollution control apparatus and in particular an apparatus and method for treating a gaseous pollutant in a gas stream as by removing the pollutant or altering the same to a non-polluting form.

Prior to the present invention, it was known that gas scrubbers could be used for removing not only solid particulate material from a dirty gas, but also treating a gaseous pollutant in the dirty gas. Also prior to the present invention, it was known that the gas scrubber could be used such that the scrubbing liquid alone removed the solid particulate material and hopefully some of the gaseous pollutants, or that a material which would act on the gaseous pollutant to remove or alter the gaseous pollutant in the gas stream could be added to the scrubbing liquid.

Prior to the present invention, conventional practice was to provide some form of a mixing vessel wherein the material used to treat the gaseous pollutant is mixed with the scrubbing liquid. The scrubbing liquid and chemical solution is then supplied to the scrubber itself. This arrangement has the disadvantage that it requires an additional vessel and mixing apparatus. In addition, it is not always certain that all of the chemical which is to react with the gaseous pollutant actually comes in contact with the gaseous pollutant.

By the present invention an apparatus has been provided which insures thorough contact between the gaseous pollutant and the material which will react or favorably combine with the gaseous pollutant. In addition, the present invention eliminates the necessity of using a separate vessel and associated equipment for mixing the scrubbing liquid and the material which will react with the gaseous pollutant.

SUMMARY

It is therefore the principal object of this invention to provide a method of treating gaseous pollutants in a gas stream which insures intimate contact between the gaseous pollutant and the material which will treat with the gaseous pollutant to either precipitate out of the gas stream that gaseous pollutant or alter the pollutant to a material or form which can be discharged to the atmosphere.

It is a further object of this invention to provide an apparatus for treating a gaseous pollutant in a gas stream which includes a means for supplying a material to the gas stream which will achieve intimate contact with the dirty gas.

The foregoing and other objects will be carried out by providing apparatus for treating gaseous pollutants in a gas stream comprising: a vessel having an inlet for a dirty gas stream containing gaseous pollutants and an outlet for cleaned gas; means dividing said vessel into a dirty gas chamber and a cleaned gas chamber; nozzle means mounted in said vessel; means for supplying a scrubbing liquid to said nozzle means; means for supplying a compressed gas to said nozzle means for atomizing said scrubbing liquid whereby said nozzle means directs the atomized liquid into the flow of dirty gas; and means for supplying a material to said means for supplying a compressed gas to said nozzle means whereby the material is conveyed to said nozzle means and is discharged from the nozzle means into the flow of dirty gas for treating gaseous pollutants in said gas stream. The objects of the present invention are also carried out by providing the method of treating gaseous pollutants in a gas stream comprising the steps of supplying a gas stream containing a gaseous pollutant, supplying a scrubbing liquid to a spray nozzle; supplying gas under pressure to said spray nozzle for atomizing said scrubbing liquid and directing the atomized scrubbing liquid into the stream of gas containing a gaseous pollutant; and supplying a material to said gas under pressure whereby the gas under pressure pneumatically conveys the material to the nozzle and is discharged from the nozzle into the stream of dirty gas and the material combines with the gaseous pollutant in the gas stream when it contacts the gas stream with the atomized liquid.

BRIEF DESCRIPTION OF THE DRAWING

The invention will be described in connection with the annexed drawing wherein.

DESCRIPTION OF THE PREFERRED EMBODIMENT

Figure 1:
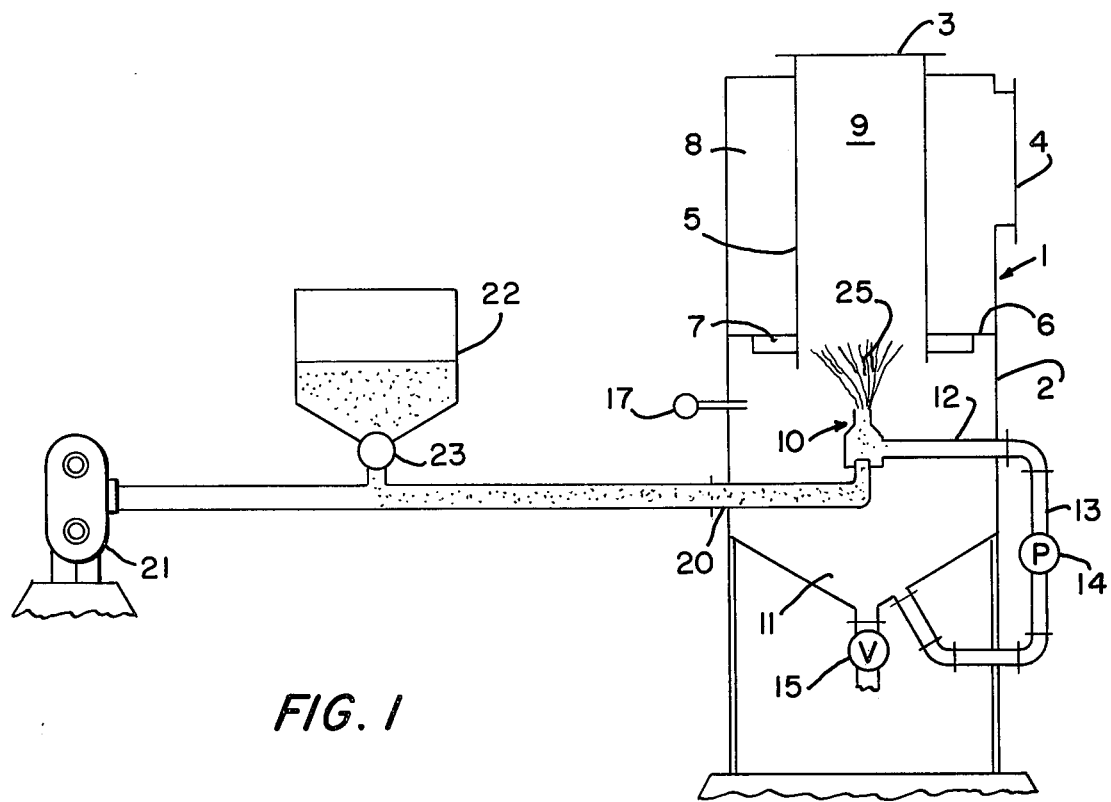
FIG. 1 is a generally diagrammatic view of the apparatus of the present invention.
Figure 2:
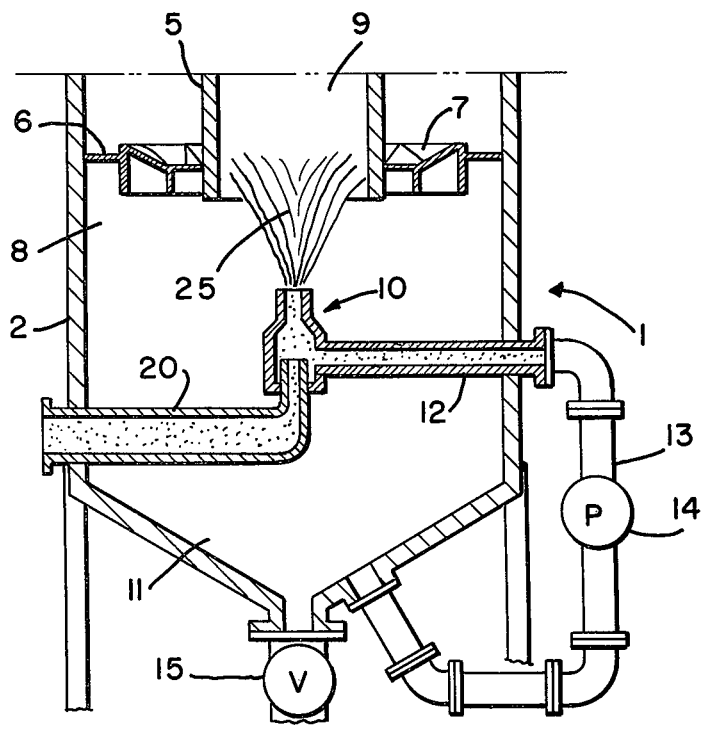
FIG. 2 is a view on an enlarged scale of the scrubbing apparatus of the present invention.

In FIGS. 1 and 2, there is shown a gas scrubber 1 similar to that shown in U.S. Pat. No. 3,651,620 issued to R. L. Lincoln and including a mist eliminator such as shown in U.S. Pat. No. 3,751,882 issued to N. D. Phillips. In this scrubber there is a vessel generally indicated at 2 which includes an inlet 3 for dirty gas which contains a gaseous pollutant and an outlet 4 for cleaned gas. A gas collecting tube 5 and a partition 6 which includes a mist eliminator 7 divide the vessel 2 into a clean gas chamber 8 and a dirty gas chamber 9 which conforms with the inside of the gas collecting tube 5. A nozzle means indicated at 10 is mounted in the lower portion of the cleaned gas chamber 8 below the partition 6 and directed upwardly into the gas collecting tube 5. This nozzle may be of the type shown in U.S. Pat. No. 3,673,769 issued to R. L. Lincoln. The bottom of the vessel defines a sump 11 for scrubbing liquid. The nozzle 10 has a conduit 12 connected thereto for supplying scrubbing liquid to the nozzle 10. In the apparatus shown, the conduit 12 is connected to a recirculation pipe 13 having a pump 14 for conducting liquid from the sump 11 to the nozzle 10. A suitable drain 15 may be provided in the bottom of the vessel 1 for removing sludge which includes pollutants removed from the dirty gas stream. Means 17 may be provided for adding scrubbing liquid to the sump 11.

A second conduit 20 extends from a source of gas under pressure such as a blower 21 to the nozzle 10. As set forth in U.S. Pat. No. 3,651,620, the blower 21 supplies gas under pressure through the conduit 20 to the nozzle 10 for atomizing scrubbing liquid supplied from conduit 12 and directing the so-atomized scrubbing liquid upwardly into the gas collecting tube 5 as shown at 25 countercurrent to the flow of dirty gas to achieve high energy contact between the scrubbing liquid and the dirty gas. The scrubbing liquid removes pollutants from the gas stream. The cleaned gas will make a 180° turn and pass through the mist eliminator 6 to the upper portion of the clean gas chamber 7 to the cleaned gas outlet 4.

By the present invention it has been found that the air under pressure used to atomize the scrubbing liquid can also be used to pneumatically convey a material to the nozzle 10. This material may be a solid particulate material which will combine favorably with the gaseous pollutants in the dirty gas stream. A hopper or other source 22 of the desired solid particulate material is provided and connected to the conduit 20 by means of a suitable valve such as a rotary feeder 23. The compressed gas from blower 21 will pneumatically convey the material from hopper 22 to the nozzle 10. From nozzle 10, the solid particulate material will be dispersed into the gas collecting tubes with the atomized scrubbing liquid. The gaseous pollutants in the dirty gas will combine with the solid particulate material and be removed from the gas stream by the scrubbing liquid and fall into the sump 11. From the sump the liquid and solid material can be either recirculated through the conduits 13 and 12 by pump 14 or withdrawn from the sump through the valve 15.

One use for the apparatus of the present invention is to remove oxides of sulfur from flue gas. In such an instance, the reactant may be an alkaline additive such as pulverized limestone. The limestone will absorb the sulfur dioxide contained in the flue gas. As an example of a use of the present invention for removing 50.0 lbs. per minute of sulfur dioxide from a flue gas, assuming a high stoichiometeric ratio of 2, the limestone required is 4.8 tons per hour which would require approximately a 5 inch rotary feeder at the valve 23 rotating at approximately 12. RPM. The air supplied from the blower 21 would convey about 2 lbs. of limestone for every 100 ACFM of compressed air assuming a liquid to flue gas ratio of 20 gallons per 1,000 ACFM. Other uses may require operations having a solid to compressed air ratio of less than 1 lb. to 100 ACFM.

The present invention may be used in other applications where it is desired to treat a gaseous pollutant such as adding dry additives (potassium permanganate) to the scrubber where it is desired to achieve odor control. The present invention may be used where the pollutant is absorbed into the reactant-scrubbing liquid slurry or where the reactant and pollutant are physically dissolved into the liquid. For example, sulfur dioxide may be removed by using oxides or carbonates of calcium, barium or magnesium in which the $SO_2$ combines with the oxide or carbonate and is absorbed in the slurry, on the other hand, oxides or carbonates of sodium absorbents are dissolved in the liquid. In addition, the present invention may be used where a gas is added to the air line 29 rather than a solid as where gaseous ammonia is used to treat $SO_2$. The reactant can also be used to chemically convert the pollutant to another form which may be removed from the gas stream or discharged to the atmosphere as a harmless material. With odor control, the pollutant may be altered but not removed from the gas stream. The important feature is that sufficient material be added to treat the desired amount of gaseous pollutants and the additive be of a nature that will combine with the gaseous pollutant to result in a material which will be removed or changed by the scrubbing action.

The method of the present invention should be readily apparent from the foregoing description of the apparatus. The method includes the step of pneumatically conveying the reactant to the scrubber with the gas which is used for achieving high energy contact between the scrubbing liquid and the dirty gas. The apparatus and method of the present invention insure intimate contact between the reactant and the dirty gas without requiring a prior mixing of the scrubbing liquid and the reactant.

I claim:

1. Apparatus for treating gaseous pollutants in a gas stream comprising:

a vessel having an inlet for a dirty gas stream containing gaseous pollutants and an outlet for cleaned gas;

means dividing said vessel into a dirty gas chamber and a cleaned gas chamber;

nozzle means mounted in said vessel;

means for supplying a scrubbing liquid to said nozzle means;

means for supplying a compressed gas to said nozzle means for atomizing said scrubbing liquid whereby said nozzle means directs the atomized liquid into the flow of dirty gas; and means for supplying a material to said means for supplying a compressed gas to said nozzle means whereby the material is conveyed to said nozzle means and is discharged from the nozzle means into the flow of dirty gas for treating gaseous pollutants from said gas stream.

2. Apparatus according to claim 1 wherein said means for supplying a compressed gas includes blower means and a conduit extending from said blower means to said nozzle means and said means for supplying material includes means for supplying a solid particulate material into said conduit.

3. Apparatus according to claim 1 wherein said means for supplying a solid particulate material includes valve means for admitting said material into said conduit.

4. The method of treating gaseous pollutants in a gas stream comprising the steps of;

supplying a gas stream containing a gaseous pollutant;

supplying a scrubbing liquid to a spray nozzle;

supplying gas under pressure to said spray nozzle for atomizing said scrubbing liquid and directing the atomized scrubbing liquid into the stream of gas containing a gaseous pollutant; and supplying a material to said gas under pressure whereby the gas under pressure pneumatically conveys the material to the spary nozzle and is discharged from the spray nozzle into the stream of dirty gas and the material combines with the gaseous pollutant in the gas stream when it contacts the gas stream with the atomized liquid.

5. The method of claim 4 wherein said material is a solid particulate material and said solid particulate material absorbs the gaseous pollutant.

6. The method of claim 4 wherein the gaseous pollutant is an oxide of sulfur and the solid particulate material is limestone and the limestone absorbs the oxide of sulfur.

* * * * *